United States Patent
Echard et al.

[11] 3,880,434
[45] Apr. 29, 1975

[54] SEALING DEVICE FOR SHAFT OF MACHINES

[75] Inventors: Pierre Echard, Chabeuil; Jean Louis Lacourieux, Bour Les Valence, both of France

[73] Assignee: Commissariat a l'Energie Atomique, Paris, France

[22] Filed: Jan. 22, 1974

[21] Appl. No.: 435,501

[30] Foreign Application Priority Data
Jan. 29, 1973 France .............................. 73.03049

[52] U.S. Cl. .................................... 277/15; 277/65
[51] Int. Cl. .................................... F16j 15/40
[58] Field of Search ............... 277/3, 15, 16, 22, 27, 277/57–65, 70, 71, 72, 79

[56] References Cited
UNITED STATES PATENTS

| | | | |
|---|---|---|---|
| 1,323,474 | 2/1919 | Hodgkinson | 277/15 |
| 2,466,025 | 4/1949 | Hanson | 277/3 |
| 2,608,380 | 8/1952 | Rice | 277/15 |
| 2,721,747 | 10/1955 | Whitfield | 277/15 |
| 2,899,245 | 8/1959 | Michel | 277/15 |
| 3,005,518 | 10/1961 | Jassniker | 277/15 |
| 3,235,269 | 2/1966 | Olesen | 277/15 |
| 3,334,905 | 8/1967 | Horwitz et al. | 277/3 |
| 3,532,444 | 10/1970 | Strub | 277/15 |
| 3,587,638 | 6/1971 | Lambrecht | 277/15 |

Primary Examiner—Robert I. Smith
Attorney, Agent, or Firm—Cameron, Kerkam, Sutton, Stowell & Stowell

[57] ABSTRACT

The device is constituted by a first dry-friction seal which prevents a first fluid from penetrating into an intermediate chamber, a second dry-friction or lubricated seal which prevents a second fluid from penetrating into the same intermediate chamber, the chamber being intended to collect leakages of the first and second fluids and being in turn divided into two compartments separated by an annular device for receiving an auxiliary fluid which is intended to prevent mixing of the first and second fluids, each compartment being connected to a circulation system for recovering the mixture of auxiliary fluid with said other fluids respectively through corresponding extraction orifices.

14 Claims, 10 Drawing Figures

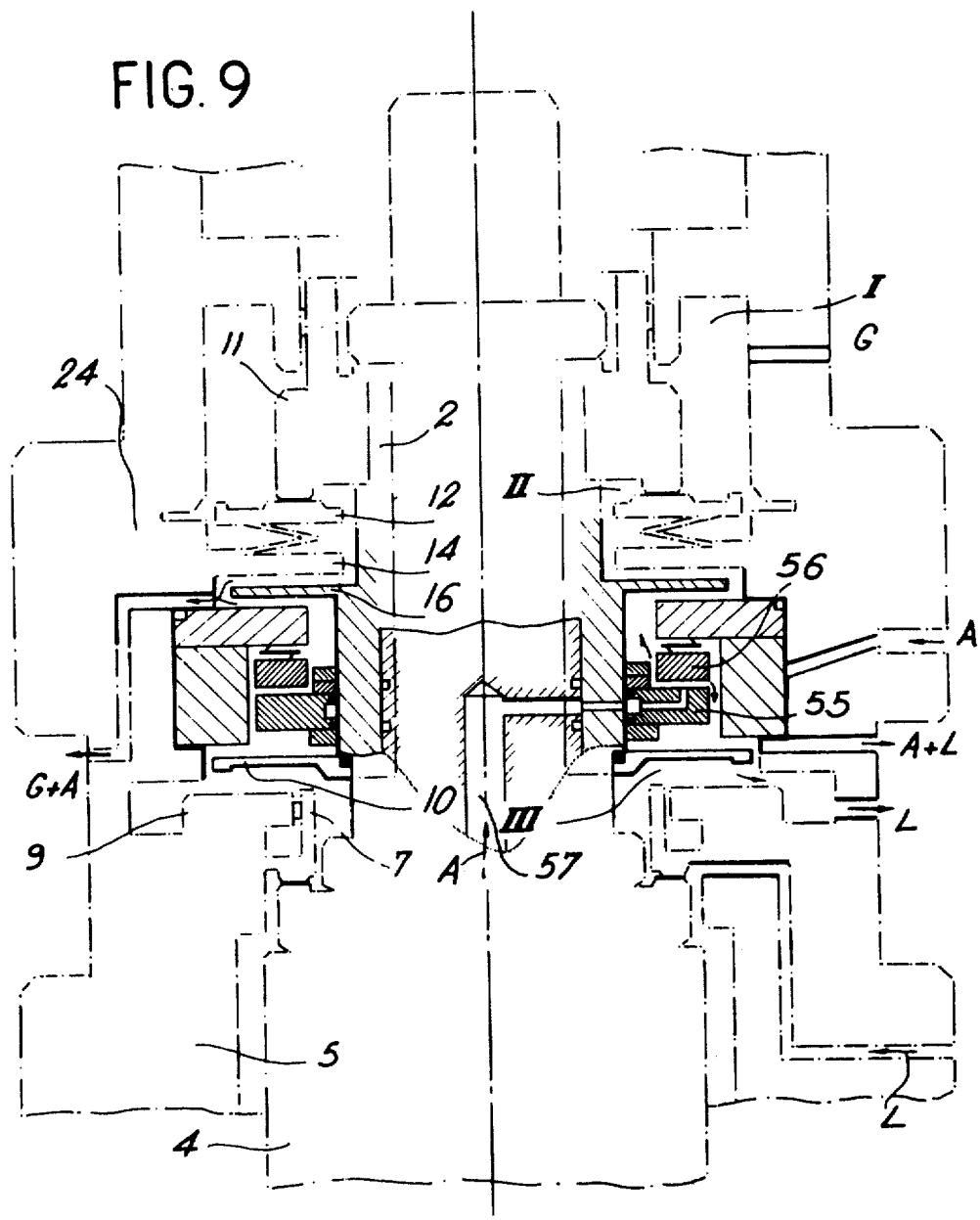

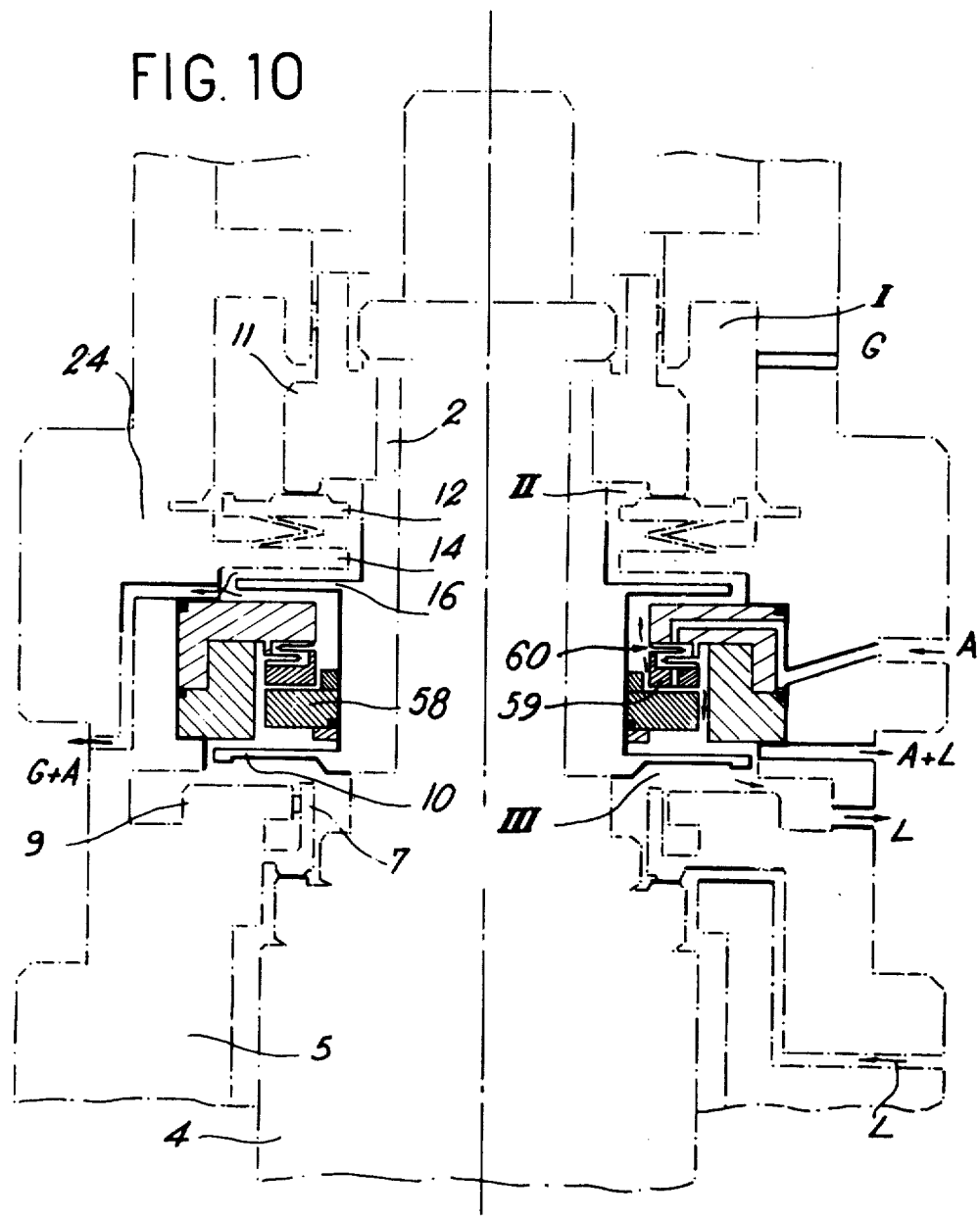

SEALING DEVICE FOR SHAFT OF MACHINES

The invention relates to sealing devices for leak-tight shaft ends and to machines adapted to receive said devices.

In machines such as pumps, compressors, motors which operate with a number of different fluids, it is necessary to provide the shaft ends with sealing devices for preventing contamination of one fluid by the other fluid or leakage of these latter into the atmosphere. Among the fluids which frequently have to be protected against contamination can be mentioned the lubricating oil used in bearings of machines which serve to process a toxic or simply precious corrosive fluid.

The aim of the invention is to provide a sealing device which ensures both isolation of the two fluids within the respective enclosure and prevents any leakage to the atmosphere which might be liable to occur.

In accordance with the invention, said device is composed of a first dry-friction seal which prevents a first fluid from penetrating into an intermediate chamber, a second dry-friction or lubricated seal which prevents a second fluid from penetrating into the same intermediate chamber, said chamber being intended to collect leakages of the first and second fluids and being in turn divided into two compartments separated by an annular device for receiving an auxiliary fluid which is intended to prevent mixing of the first and second fluids, each compartment aforesaid being connected to extraction orifices corresponding to a circulation system for recovering the mixture of the auxiliary fluid with the first and second fluids respectively.

The description relates to non-limitative examples of construction and refers to the accompanying drawings in which:

FIGS. 2, 3, 4, 5, 6, 7, 8, 9, 10 illustrate alternative forms of construction of the device in accordance with the invention.

Figure 1:
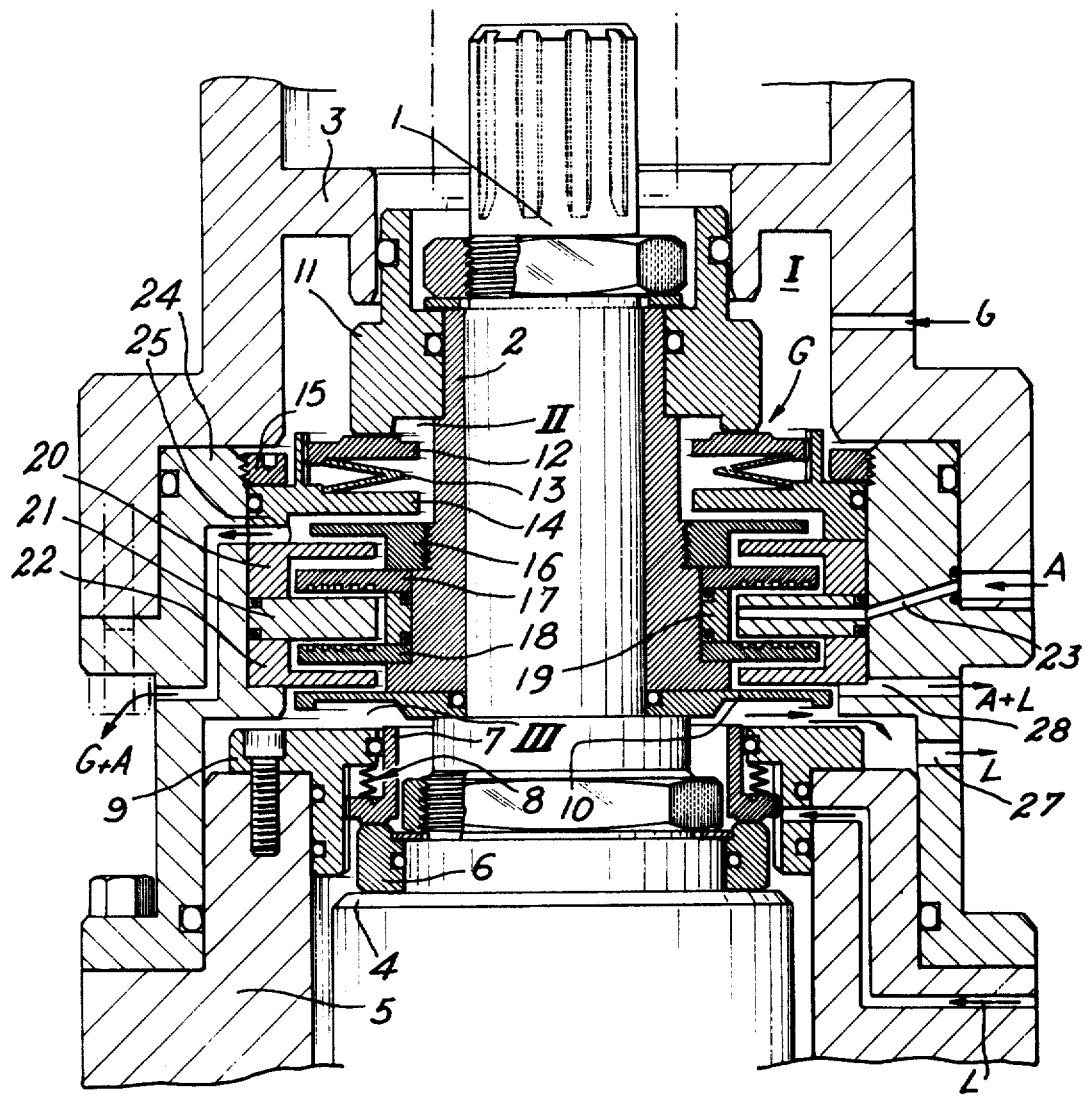
FIG. 1 is a sectional view of the sealing device.

There is shown in FIG. 1 a shaft 1 and a sleeve 2 fixed on said shaft in a manner which is not illustrated. The shaft 1 can be common to a machine such as a compressor in which one end of the compressor casing is shown at 3 and to its driving motor in which the ends of the motor housing are shown at 5. Alternatively, said machine and said motor can each have their own shaft coupled together by means of any suitable system.

The casings of the two machines are connected together by means of an intermediate sleeve 24 which can serve as a sealing component and also take part in the relative centering of the two machines.

The sleeve is fitted with static seals which ensure leak-tightness between the two machines and the surrounding atmosphere.

On the side nearest the motor at the bottom of the figure, there is shown a first seal composed of a collar 6 which is fixed in leak-tight manner on an annular shoulder 4 of the shaft. Said collar 6 forms a runner face for a floating ring 7 which is joined to the motor housing 5 in leak-tight manner by means of an O-ring seal and in an elastic manner by means of springs 8 applied against an annular flange 9 which is secured to the housing. A bellows seal which ensures leak-tightness can advantageously replace the device described in the foregoing. Similarly a deflector 10 is fixed on an annular shoulder of the shaft.

On the compressor side at the top of the figure, there is shown a collar 11 which is fixed in a leak-tight manner on the sleeve 2. Said collar 11 serves as a runner face for a dry-friction seal consisting of the ring 12 which is attached in an elastic manner by means of a bellows element 13 to an annular member 14 which is in turn positioned angularly and in a leak-tight manner with respect to the packing gland 24 by means of a ring 15. A centrifuging disc 16 is fixed on the shaft whilst two cheeks 17 and 18 separated by an annular packing-piece 19 are fixed in leak-tight manner on the sleeve 2.

The reverse configuration can be adopted as a function of technological and thermal considerations: the rings 7 and 12 can be mounted on the shaft as rotating parts while the collars 6 or 11 which serve as runner faces are in that case rigidly fixed to the elastic device.

Spacer members 20, 21 and 22 which are fixed in leak-tight manner in the packing gland 24 are placed astride the two cheeks 17 and 18 with a minimum clearance which permits displacement of the rotating assembly as a result of mechanical play and expansion. Said clearance is of the order of 0.5 millimeter. As shown in FIG. 1, the cheeks 17 and 18 are fitted on at least one of their faces with spiral-shaped grooves for the purpose of enhancing the centrifugal effect and permitting the discharge to the periphery of solid elements which circulate or are formed between cheeks and spacer members.

There is pierced in the spacer member 21 and in the packing gland 24 a duct 23 for the admission of an auxiliary sealing fluid A, the flow path of said fluid within the interior of the device being indicated by arrows.

Moreover, the annular member 14 which forms the base-fitting of the bellows element is provided with an open portion over a sector and is connected by means of a hole formed in the packing gland 24 and a duct 25 to a recovery system which is not shown in the drawings. Said duct 25 is intended to ensure the discharge of the mixture of the first fluid 6 and of the auxiliary fluid A as indicated by the arrows.

Similarly, there is shown at 26 a duct which is formed in the motor housing 5 for the admission of the second fluid L which is a lubricant, for example. Another duct 27 is intended to collect the greater part of leakages of the fluid whilst a third discharge duct 28 formed in the packing gland 24 is intended to collect the mixture of leakages of fluids A and L through the deflector 10.

The operation of the device takes place as follows. The three systems provided in said device delimit four enclosures having different functions. The end enclosures communicate with the leak-tight casings of the machines such as, for example, a motor and a compressor containing fluids G and L which must be prevented from mixing with each other and from leaking into the atmosphere. There is shown at the top portion of FIG. 1 the first enclosure which is designated by the reference I and contains the fluid G. Said enclosure is limited by the casing 3 of the compressor, the packing gland 24, the ring 15, the annular member 14, the bellows element 13, the ring 12 (all these components being stationarily fixed), the collar 11 fixed on the sleeve which is in turn fixed on the rotary shaft 1. It is apparent that dynamic leak-tightness is ensured by the seal formed by the two members 12 and 11.

A similar arrangement delimits the enclosure which is located at the other end and designated by the reference IV at the bottom of the figure whilst a fluid designated as L (in the form of a lubricant, vapors or aerosols) being supplied to the enclosure through the inlet duct 26. This enclosure is limited by the motor housing 5, the annular flange 9, the O-ring seal, the floating ring 7 (all these components being stationarily fixed), the collar 6 which forms a runner face being fixed on an annular shoulder of the shaft 1. Dynamic leak-tightness of said enclosure IV is ensured by means of the frictional seal between the components 6 and 7.

Between the two sealing systems 6–7 and 11–12 which are thus formed, there is defined an intermediate chamber limited by the shaft 1, its sleeve 2 and the packing gland 24. Said intermediate chamber receives the leakages of the fluids G and L and is in turn divided into two compartments. One compartment which is designated in the figure by the reference II is formed between the friction seal 11–12 and the seal which is constituted by the assembly consisting of the cheek 17 and the spacer member 21. The other compartment which is designated in the figure by the reference III is formed between the seal 6–7 and the seal which is constituted by the assembly consisting of the cheek 18 and the spacer member 21.

It is apparent that leakages of fluid G through the seal 11–12 have a tendency on the one hand to escape through the duct 25 and that the leakages of fluid L through the seal 6–7 have a tendency on the other hand to escape through the ducts 27 and 28. These leakages can be either recovered or destroyed.

The auxiliary sealing fluid A which is admitted through the duct 23 at a pressure which is higher than each of the discharge pressures within the ducts 25 and 28 escapes between the seals formed by the cheeks 17 and 18 and the spacer member 21 and forces back the leakages of fluids G and L respectively into their compartments II and III which contain the mixtures on the one hand of the fluids G and A and on the other hand of the fluids L and A which escape through the ducts 25 and 28 respectively.

The auxiliary fluid A which is intended to be mixed with the first fluid (6) and second fluid (L) is chosen especially as a function of its chemical affinities with these latter. By way of example, said auxiliary fluid can be nitrogen or in some cases air. If the ducts 25 and 28 are connected to a suction circuit, the duct for the fluid A can accordingly be constituted simply by putting into communication with the atmosphere.

When the fluid G is liable to form solid deposits, the sleeve is fitted with a dispersing device 16 which maintains the deposit in a finely divided state at the orifice of the duct 25 in order to prevent clogging of this latter.

In order to limit the quantity of fluid L which would be mixed with the auxiliary fluid A, there is fixed on the shaft 1 a deflector 10 in which the clearance between the outer rim of said deflector and the packing gland 24 is reduced to a minimum value. In this manner, the greater part of leakages of L through the sealing system 6–7 is discharged through the duct 27, thus reducing the proportion of fluid L in the mixture of L with the fluid A which escapes through the duct 28.

The sealing system which divides the intermediate chamber formed by the seals 6–7 and 11–12 into two compartments designated by the references II and III and which is constituted in FIG. 1 by the combination of the cheeks 17 and 18 and spacer members 20, 21 and 22 forms the subject of alternative embodiments which will be described with reference to the remaining figures.

Figure 2:
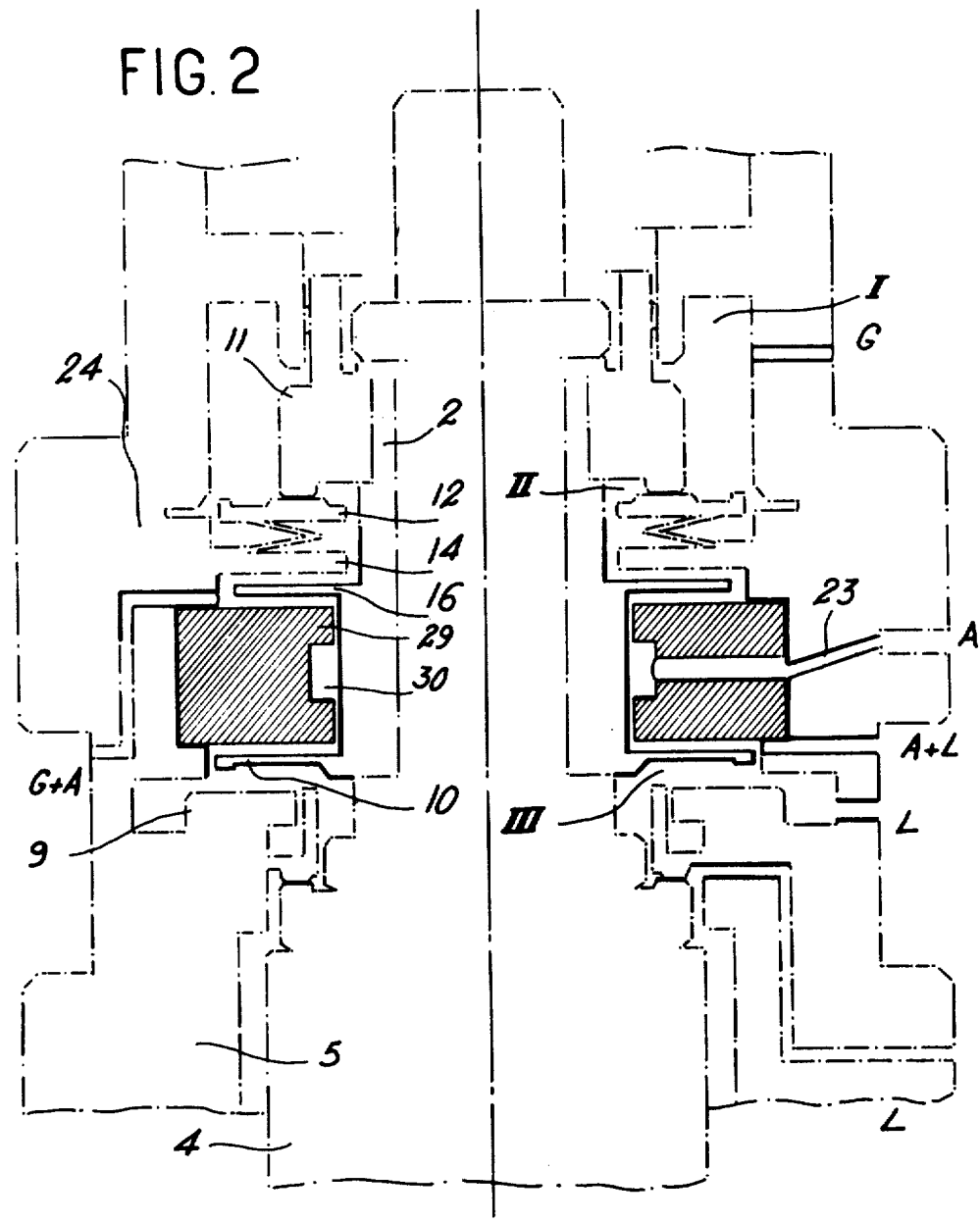

In FIG. 2, leak-tightness is achieved by means of a distributor-ring 29 which is mounted in leak-tight manner within the packing-gland 24; the clearance provided around the ring has the minimum value imposed by the relative displacements of the shaft, namely a few tenths of a millimeter. Substantially in the central portion of said distributor-ring, there is formed a circular groove 30 in order that the auxiliary fluid A which is admitted through the duct 23 can be distributed around the entire ring and permitted to escape towards the compartments II and III respectively.

One disadvantage of this system lies in the fact that the clearance between the distributor-ring and the sleeve is relatively high and results in a high consumption of auxiliary sealing fluid.

Figure 3:
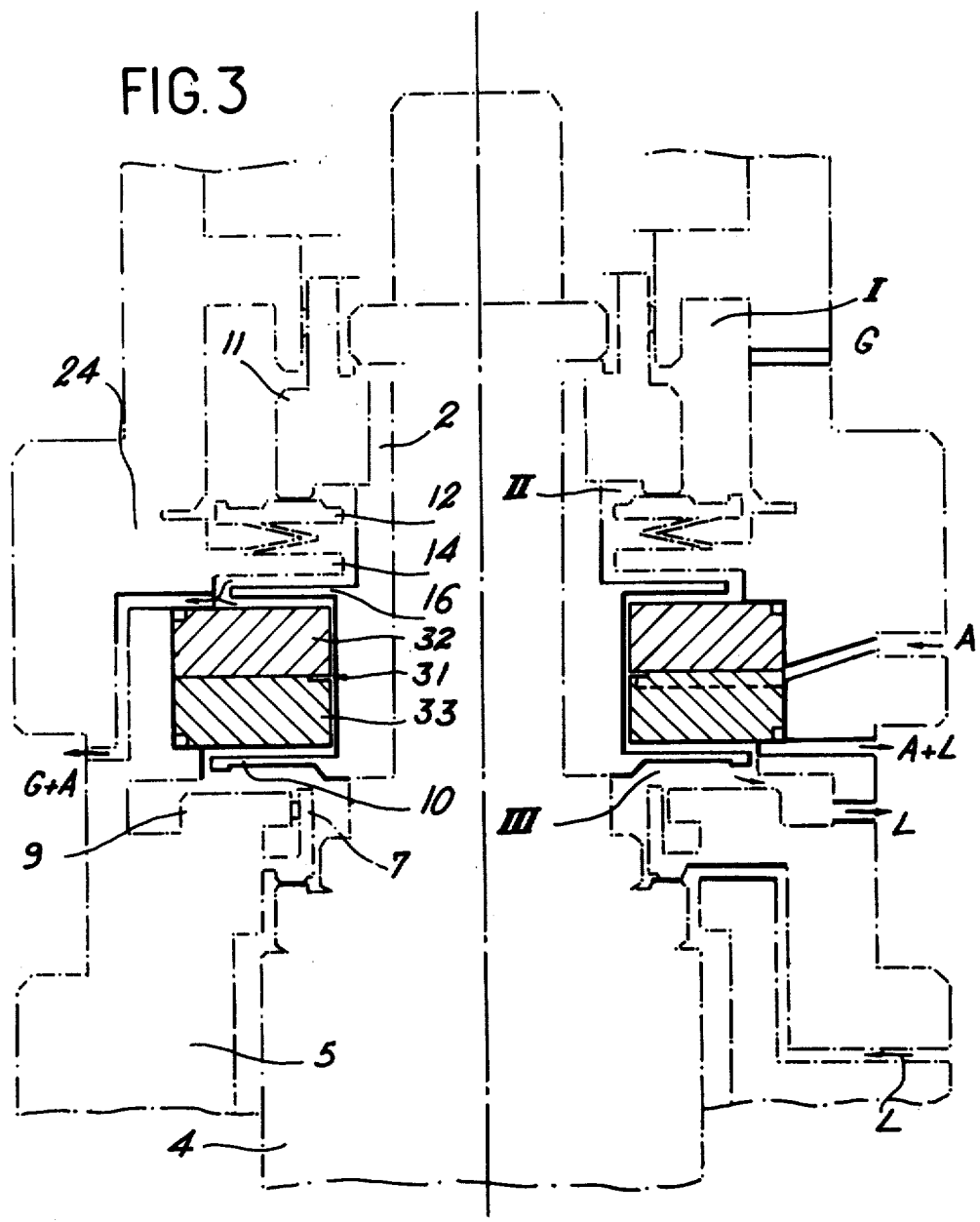

FIG. 3 shows an alternative form in which the distributor-ring is designed in two sections 32 and 33 between which is formed an annular slit 31 having a smaller cross-section than that of the duct 23 for the admission of auxiliary fluid A.

The rate of flow of the auxiliary sealing fluid A is thus reduced but retains high velocity and a uniform distribution, thus contributing to leak-tightness between the two compartments II and III described in the foregoing.

Figure 4:
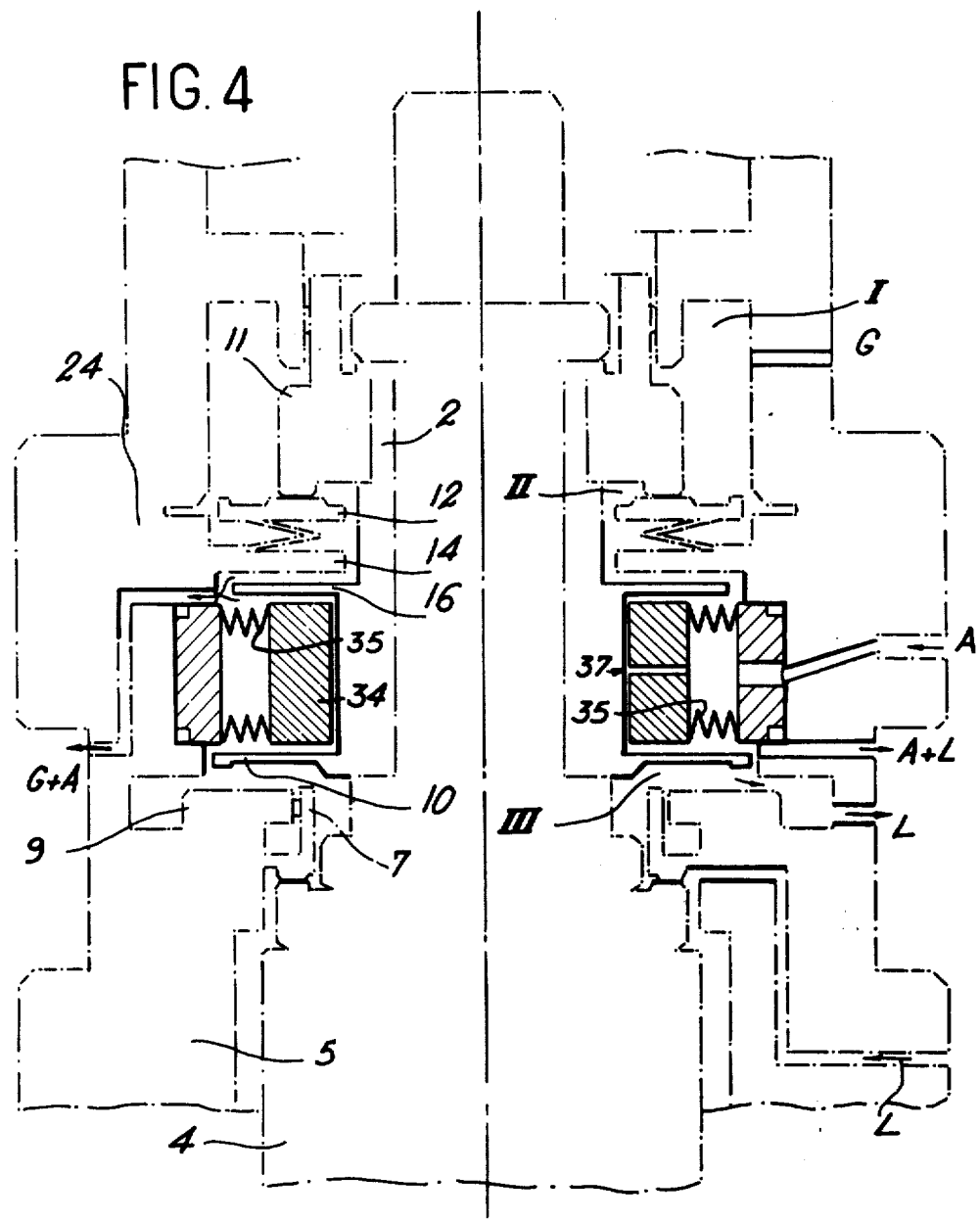

In the alternative form of FIG. 4, the distributor-ring 34 is mounted in an elastic manner by means of two leak-tight membranes 35 having a low degree of radial stiffness on a supporting-ring 36 which is secured to the packing-gland 24. The fluid A penetrates through the duct 23 into the space formed between the membranes and is admitted between the distributor-ring 34 and the sleeve 2 through a plurality of ducts 37 which traverse said distributor-ring.

Figure 5:
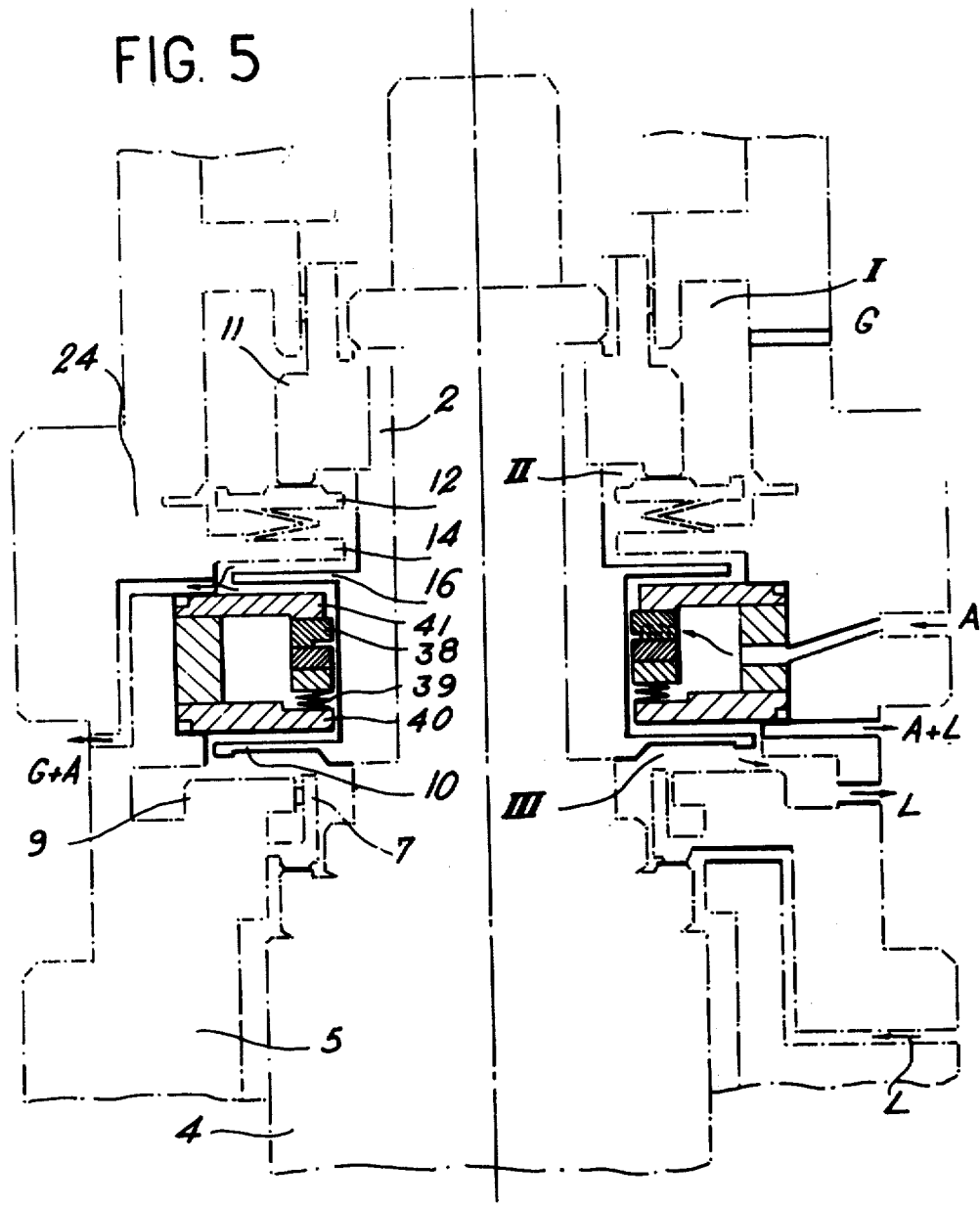

In this system, it is apparent that the distributor-ring 34 can be slightly displaced with respect to the stationary portion and can therefore be adjusted so as to fit much more closely against the sleeve 2 and to follow the lateral displacements of this latter. These clearances are therefore much smaller and the consumption of fluid A is reduced accordingly. In the case of a higher velocity of flow within the clearance space, the fluid A additionally provides an aerostatic lifting film which prevents any contact between the two components. In the alternative form of FIG. 5, the distributor-ring 38 is made up of two floating sections between which the auxiliary sealing fluid can be injected. This distributor-ring 38 is connected to the stationary portion by means of a bellows seal 39, said seal being in turn attached to the spacer member 40 which is fixed on the packing gland. Another spacer member 41 which is fixed on the same packing gland serves as a support for the distributor-ring 38 which is thrust against this latter as a result of the elasticity of the bellows seal 39.

Figure 6:
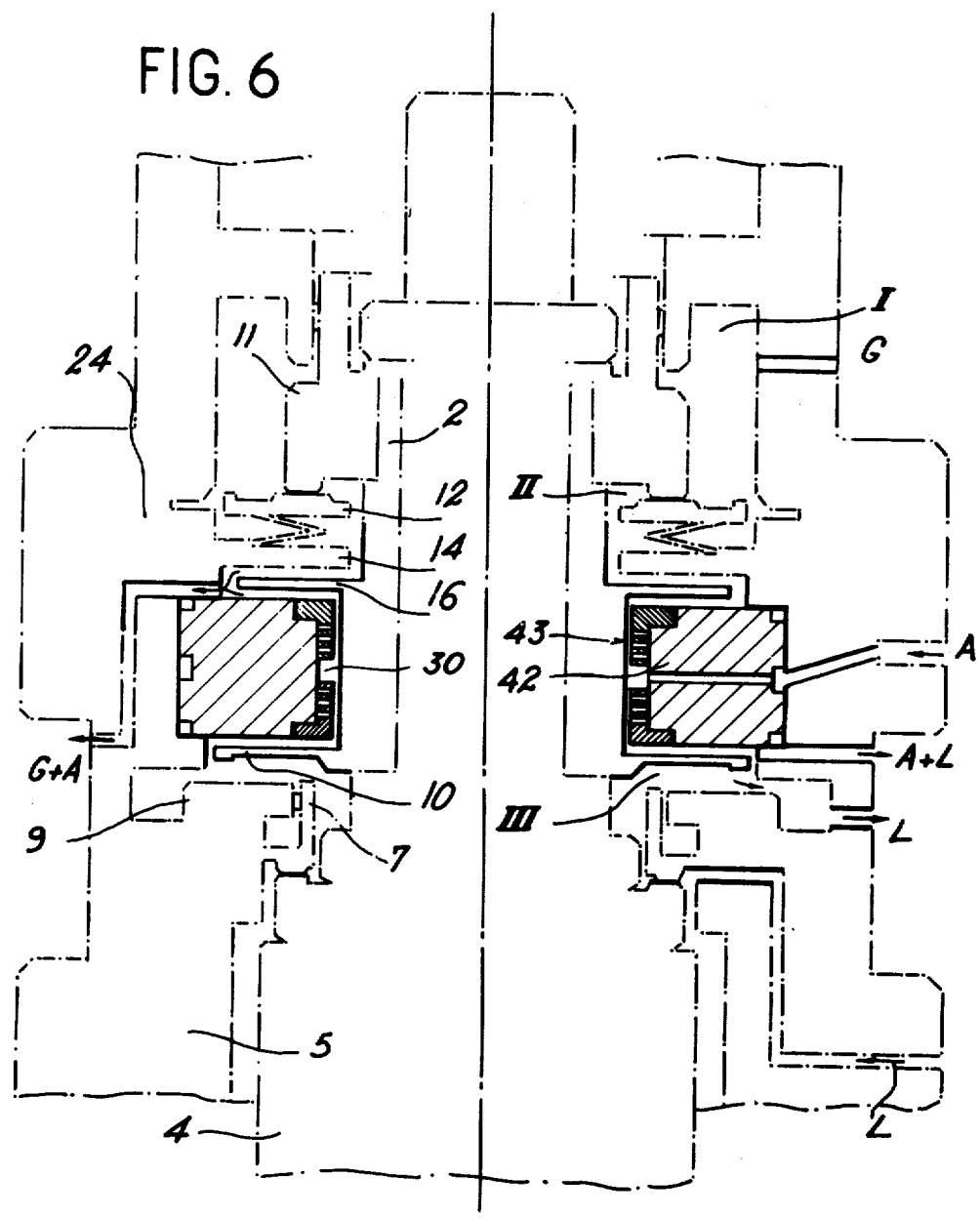

FIG. 6 shows a distributor-ring 42 which is stationary with respect to the packing gland and on which annular components 43 formed of a solid lubricating substance such as polytetrafluoroethylene have been mounted on each side of the annular groove 30. Said annular components 43 are mounted so as to be in tightly fitting contact with the sleeve 2 and spaced axially by means of distance-pieces so as to form expansion chambers between said components. In the event of friction, said annular components 43 undergo creep deformation or wear, thus automatically achieving an assembly with minimum play and reducing the consumption of fluid A.

Figure 7:
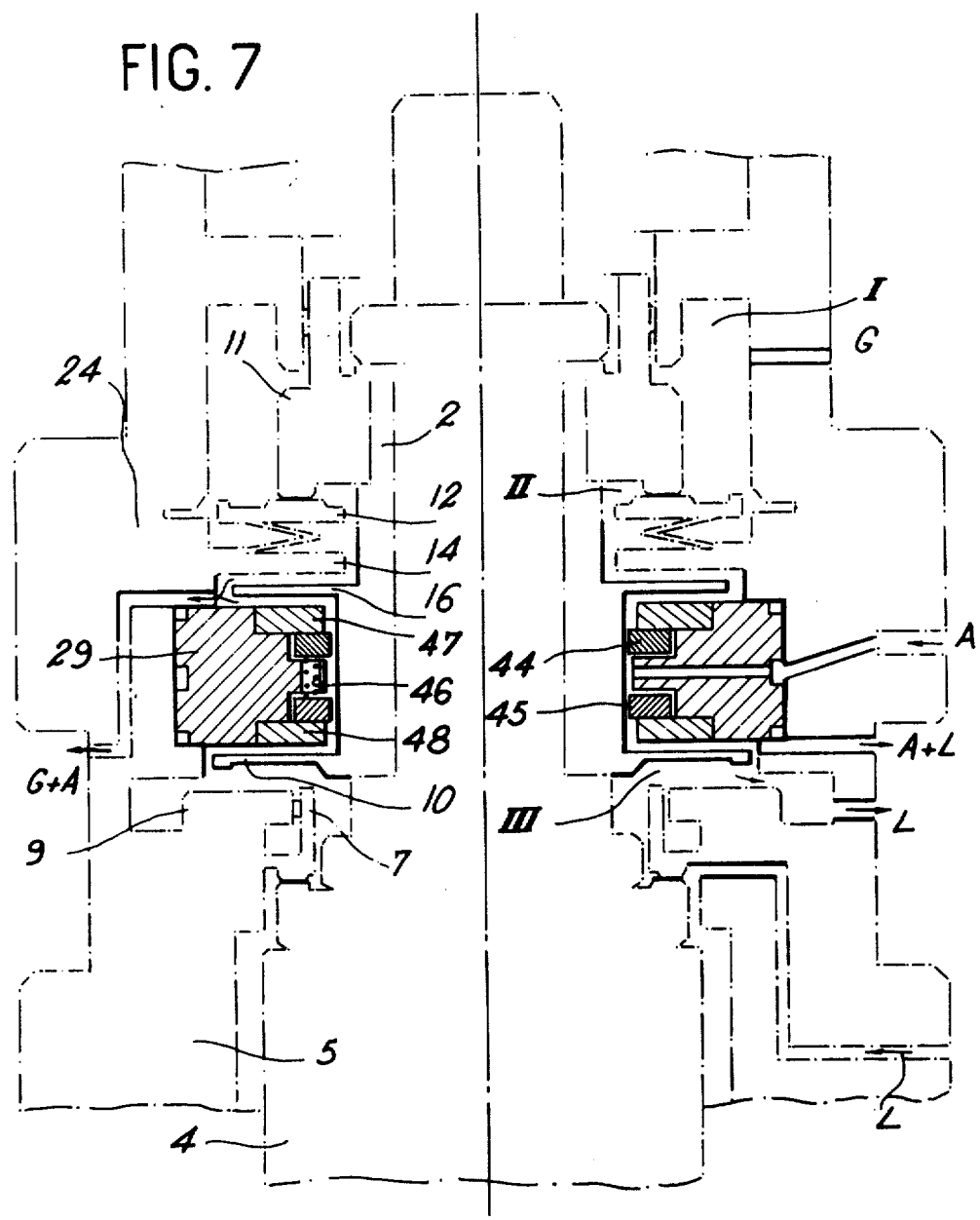

In the alternative form of FIG. 7, the distributor-ring 29 which is secured to the packing gland 24 contains two annular components 44 and 45 which are applied axially against two strengthening members 47 and 48 by means of a number of springs 46. In consequence, said annular components 44 and 45 are each capable of radial displacement with respect to the distributor-ring 29 and thus of following the slight irregularities of rotation of the shaft (defective roundness, vibrations and so forth); the clearance between said components and the shaft can thus be of a low order, namely a few hundredths of a millimeter.

In the systems described in the foregoing, it will prove advantageous to coat the surfaces which delimit the clearance space with an anti-wetting product such as polytetrafluoroethylene, for example, in order to prevent migrations of the fluid L towards G by capillarity.

Figure 8:
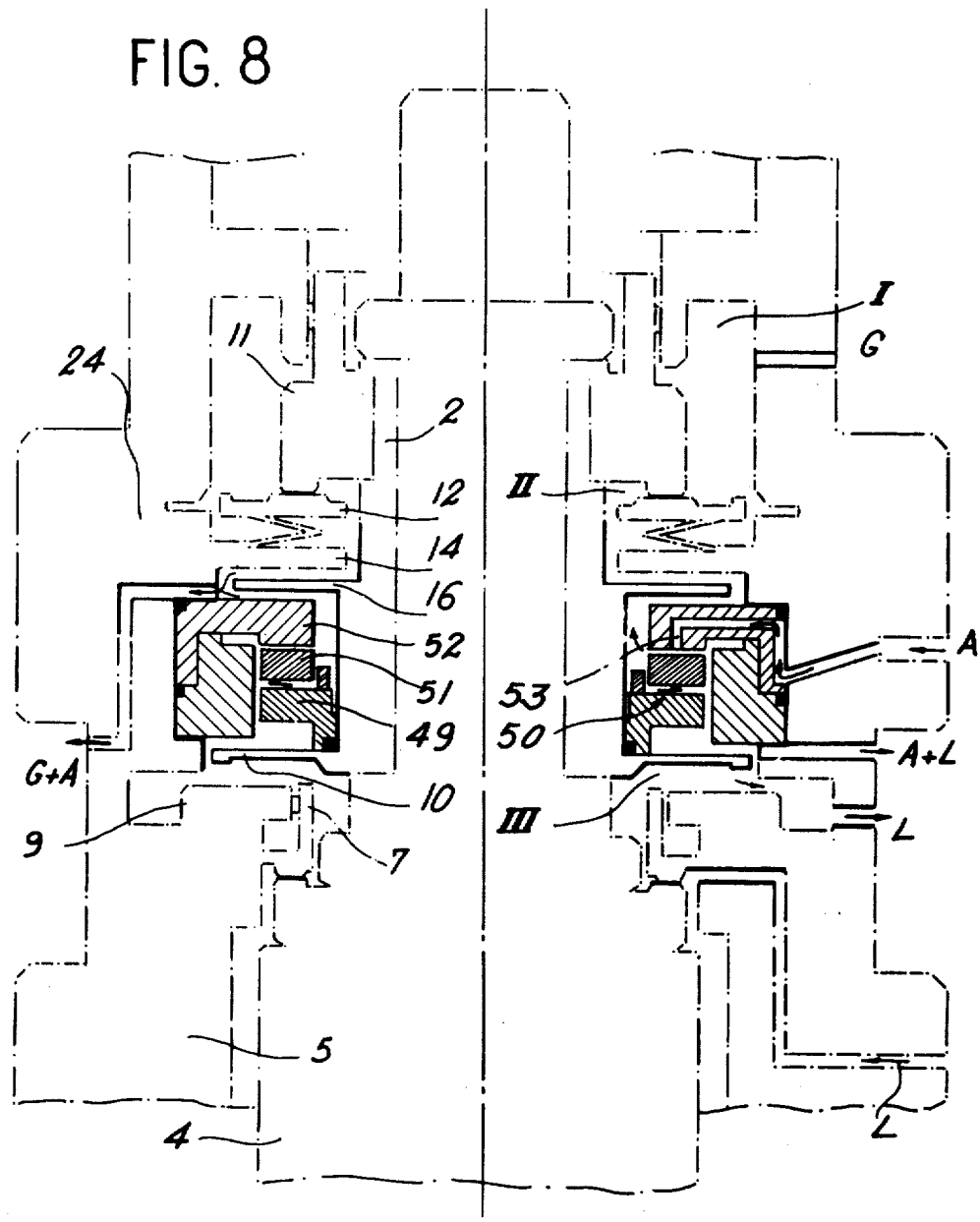

FIG. 8 shows a slightly different system in which leak-tightness between the two compartments II and III is achieved by means of an aerostatic or hydrostatic thrust member of known type. There is shown in this figure a member 52 which forms a runner face andis fixed in leak-tight manner on the packing gland 24. Another support 49 in the form of an annular plate is fixed on the sleeve 2 which surrounds the shaft.

A bellows seal 50 is attached to the supporting member 49 aforesaid and serves to retain a ring 51 which is applied by elasticity of the bellows seal 50 against the member 52 which forms a runner face. The auxiliary fluid A is introduced through the duct 23 and then through the duct 53 into the interface of the sealing system 51–52. By means of this system, leak-tightness is ensured in a known manner between the compartments II and III and a controlled leakage of the fluid A takes place towards these two compartments as indicated by the arrows.

In an alternative form of this system which is shown in FIG. 9, the member which forms a runner face 55 can be fixed on the shaft and is therefore capable of rotation whilst the ring 56 can be connected to the packing gland by any leak-tight and elastic system. In this case, the supply of fluid A can be carried out, for example, through a duct 57 which extends longitudinally through the shaft.

In a second alternative form of construction of this system which is shown in FIG. 10, the ring 58 can be fixed on the shaft and is therefore capable of rotating whilst the runner-face component 59 is applied elastically against the ring by means of bellows seals 60 forming a leak-tight chamber which enables the auxiliary fluid A to penetrate into the interface of the sealing system 58–59.

There has thus been described a sealing device for a leak-tight shaft end providing a coupling between two machines containing fluids which are not intended to be mixed and must not be permitted to escape into the atmosphere. The device has been applied to a motor compressor set.

The compressor was supplied with uranium hexafluoride $UF_6$ which had to be free from any contamination by the vapors or aerosols of the lubricating oil of the bearings. This device has withstood fluid pressures of 50 to 2,000 millibars. The differential pressure between the compressor and the intermediate chamber was usually of the order of 20 millibars but could attain 200 millibars. The auxiliary fluid employed was nitrogen.

The rate of friction of the seals was 20 meters per second and could attain 30 meters per second. The average service life of this device is within the range of 25,000 to 45,000 hours.

In addition to these outstanding properties of rugged construction and small maintenance requirements which contribute to a high degree of reliability, it is also worthy of note that this system is of specially compact design and has been constructed in the form of an interchangeable unit, thereby representing a substantial economy in the change of packing.

What we claim is:

1. A sealing device for shaft ends connecting two machines containing respectively fluids which have to be prevented from mixing with each other, wherein said device is constituted by a first dry-friction seal which prevents the first fluid from penetrating into an intermediate chamber, a second dry-friction or lubricated seal which prevents a second fluid from penetrating into the same intermediate chamber, said chamber being intended to collect leakages of the first and second fluids and being in turn divided into two compartments separated by an annular device for receiving an auxiliary fluid which is intended to prevent mixing of the first and second fluids, each compartment aforesaid being connected to a circulation system for recovering the mixture of auxiliary fluid with said other fluids respectively through corresponding extraction orifices.

2. A sealing device according to claim 1, wherein the orifices of one of the two compartments are protected against any powdered deposits produced by the first and second fluids or as a result of contacting of said fluids by means of a centrifuging device mounted on the rotary shaft.

3. A sealing device according to claim 1, wherein one or both of said compartments are in turn divided into two half-compartments by means of a deflector, each half-compartment aforesaid being connected respectively through one or two orifices to two extraction circuits.

4. A device according to claim 1, wherein said annular device for separating the intermediate chamber is constituted by at least two rotary cheeks rigidly fixed to the shaft, each rotary cheek aforesaid being placed against stationary spacer members at the minimum distance permitted by the expansion of the assembly, said spacer members being fitted in position against the shaft at the minimum distance which permits frictionless rotation of said shaft, a spacer member being pierced radially by a duct which has its opening between the two cheeks and through which an auxiliary fluid is introduced between the two compartments aforesaid.

5. A sealing device according to claim 4, wherein each cheek is provided on at least one face with tracks in the form of spiral grooves.

6. A sealing device according to claim 1, wherein said annular device is constituted by a stationary distributor-ring which is fitted in position against the shaft at the minimum distance which permits frictionless rotation of said shaft, said distributor-ring being provided with a circular groove which surrounds the shaft, a duct being formed in said distributor-ring up to the circular groove in order to supply said groove with auxiliary fluid.

7. A sealing device according to claim 6, wherein said distributor-ring is constituted by two half-rings assembled together, an annular slot being formed between the two half-rings, the rate of flow of fluid within said annular slot being lower than the rate of flow in the duct through which the auxiliary fluid is supplied.

8. A sealing device according to claim 6, wherein said distributor-ring is connected to the stationary portion by two leak-tight flexible membranes, the duct for supplying the distributor-ring with auxiliary fluid being such as to have its opening between the two flexible membranes aforesaid.

9. A sealing device according to claim 6, wherein said distributor-ring which is elastically mounted around the shaft is connected to a fixed spacer member by means of a leak-tight bellows seal in concentric relation with the shaft which applies said spacer member in leak-tight manner against another spacer member connected to the stationary portion, the duct for the supply of auxiliary fluid being intended to open between the two spacer members aforesaid.

10. A sealing device according to claim 6, wherein said distributor-ring is provided at the level of the friction surface against the shaft with a stack consisting of a plurality of annular components of lubricating material, said annular components being maintained in relatively spaced relation by means of distance-pieces and applied in frictional contact with the shaft.

11. A sealing device according to claim 6, wherein said distributor-ring comprises two annular components which are self-centered on the shaft by the stream of auxiliary gas which escapes between said components and said shaft, said two annular components being applied in leak-tight manner by means of an elastic device which tends to maintain them in spaced relation against two thrust-bearing rings carried by said distributor-ring, the auxiliary fluid supply duct being located within the distributor-ring between the two self-centered annular components.

12. A sealing device according to claim 1, wherein said annular device is constituted by one or two seals which operate on the hydrostatic or aerostatic principle by means of the auxiliary fluid having leakages which are distributed within the two compartments.

13. A sealing device according to claim 1 in which the supply of auxiliary fluid is put into communication with the atmosphere.

14. A sealing device according to claim 1, wherein the auxiliary gas is nitrogen.

* * * * *